Aug. 14, 1934.  C. R. HUBBARD ET AL  1,969,797
OIL SEALING DEVICE
Filed July 30, 1932

INVENTORS:
Cecil R. Hubbard
and Robert M. Waples,
BY Fraser, Myers
& Manley,
ATTORNEYS.

UNITED STATES PATENT OFFICE 1,969,797

OIL SEALING DEVICE

Cecil R. Hubbard and Robert M. Waples, Palmyra, N. Y., assignors to The Garlock Packing Company, Palmyra, N. Y., a corporation of New York Application July 30, 1932, Serial No. 626,892

2 Claims. (Cl. 288—1)

This invention relates to improvements in machinery packing of a type which is especially adapted for use in preventing the escape of lubricants from joints between movable parts of machine units and in excluding dust and other foreign matter from the bearing or other lubricated part needing protection. Oil-sealing and dust-excluding devices of this character are of importance as a source of economy of lubricating material, as an element tending to the durability and satisfactory working of the protected part of the machine element, and as a means of keeping the part of the mechanism protected by the packing neat and attractive.

The invention disclosed and claimed in this application is a development of and an improvement on the one disclosed in our prior application, Serial No. 599,876, filed March 19, 1932.

It is an object of the invention to provide a packing of the above-described character comprising a sealing element and means whereby the element may be maintained in sealing contact with the surface of a machine element at a joint to be sealed, and means not dependent upon the use of a metallic spring of any character whereby the sealing contact may be constantly maintained notwithstanding any wearing away of the material which may occur within the intended life of the packing.

It is another object of the invention to use as the means of maintaining the sealing contact between the working element of the packing and an opposed part of the machine element with which it is used, a resilient member of some material having the physical properties of rubber composition which will tend to keep all parts of the packing in their proper relative positions and will also tend to serve as an auxiliary sealing means to prevent the escape of lubricant.

In the accompanying drawing illustrating preferred forms of the invention—

Figure 1:
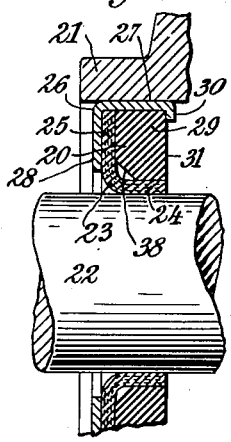
Figure 1 is a transverse sectional view through a part of a machine representing one form of packing embodying the invention as used to seal a joint between two rotatable or otherwise movable machine elements.
Figure 2:
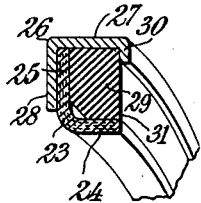
Fig. 2 is a view, partly in cross-section and partly in perspective, illustrating the oil-sealing device, included as a part of the structure shown in Fig. 1, as having been detached from other parts of the structure.
Figure 3:
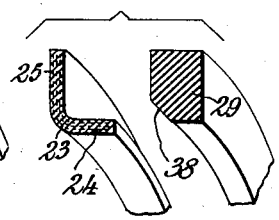
Fig. 3 is a view, partly in cross-section and partly in perspective, illustrating two of the elements of the structure represented by Fig. 2 separated from each other.

As represented in Figs. 1, 2 and 3, the invention may comprise a packing or oil-sealing device 20 adapted to seal the space between a pair of relatively movable parts 21, 22. This form of the invention is best adapted for use when sealing the joint about a rotatable shaft 22 surrounded by a concentric, fixed structure 21.

The packing embodying the invention in this form comprises a ring of flexible material 23, preferably of some tough and durable fibrous material saturated with a suitable filling composition, and preferably of L form in cross-section, having a cylindrical element or lip 24 which may be held in contact with the surface of the shaft 22 and a radial flange 25 to partly close the space between the shaft 22 and surrounding machine element 21.

As a means whereby the packing element 23 may be held in proper position, an abutment ring 26 is provided having one portion 27 adapted to be secured in oil-tight contact with the machine element 21 and a radial flange 28 in overlapping relationship with the flange 25 of the packing element 23 and between which and said flange 25 an oil-tight contact may be maintained by pressure within the portion of the machine element in which the lubricant is to be sealed.

The preferred means whereby the lip 24 may be maintained in contact with the shaft 22 comprises a ring of resilient material 29 of a form such as to substantially fill the annular channel between the lip 24 and the element 27 of the abutment ring. This resilient ring 29 will preferably be constructed of a material having the physical properties or characteristics of rubber composition, and it should be of a radial depth such as to be slightly compressed between the lip 24 and the element 27 of the abutment ring whereby it will constantly tend to press the lip 24 against the surface of the shaft 22. This ring 29 also serves as a means of preventing the escape of lubricant between its outer surface and the inner surface of the element 27 of the abutment ring, and the friction between the ring 29 and the parts of the packing between which it is compressed tends to prevent the rotation of the sealing ring 23 by the shaft 22. Due to the substantially incompressible but fluid-like character of the composition of the ring 29, every portion of its surface which is in contact with either the sealing ring 23 or abutment ring 26 will exert a substantially uniform pressure against the surface by which its expansion is opposed.

The ring 29 having contact with the radial flange 25 and the cylindrical lip 24 of the packing element tends to constantly maintain the packing element in its normal sealing position with respect to the abutment ring and the shaft.

The ring 29 may be of suitable composition to resist any rapid or material decomposition or impairment due to contact with the oil to be sealed, and any such slight bulging or expansion of the material which may result from its association with the lubricating material will tend to compensate for the slight wearing away of the lip 24 of the sealing ring due to frictional contact between the ring and the shaft 22, whereby this swelling or expansion of the resilient ring will be beneficial rather than detrimental.

The abutment ring 26 may be secured in the machine element 21 in any appropriate manner, as, for example, by machining the parts to a relatively close fit and pressing the ring into the opening in the surrounding structure.

If desired, the resilient ring 29 and packing ring 23 may be secured in position in the abutment ring 26 by providing the element 27 of the abutment ring with an inturned flange 30 having engagement with a portion of the exposed radial surface 31 of the resilient ring. In this manner the entire packing element may be put up in a self-contained form adapted for insertion between two relatively movable machine elements the space between which is to be sealed.

Figure 4:
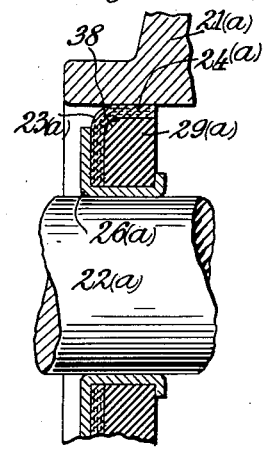
Fig. 4 is a cross-sectional view through a part of a pair of machine elements, the joint of which is represented as being sealed by packing embodying the invention in modified form.

The form of the invention illustrated in Fig. 1 is best adapted for use when the outer machine element 21 is to be fixed or stationary, or relatively stationary, and when the shaft 22 is intended to rotate. In Fig. 4 is represented a modified form of the invention better adapted for use when the shaft 22(a) is intended to be fixed and the surrounding element 21(a) is to rotate. In accordance with this modification of the invention the abutment ring 26(a) will be fixedly secured to the shaft 22(a) and the packing ring 23(a) will have its cylindrical lip 24(a) held in frictional contact with the surface of the moving part 21(a) by means of the resilient ring 29(a).

The form of the invention illustrated in Fig. 4 might also be used in connection with a machine the element 22(a) of which is to rotate, if the rotation is not so great as to result in undue friction between the lip 24(a) of the packing and the machine element 21(a) due to centrifugal force.

The form of the invention illustrated in Fig. 1 might also be used in machines the element 21 of which is intended to rotate, if the speed of rotation is not so great as to unduly reduce the pressure between the lip 24 and the element 22 due to centrifugal force.

Figure 5:
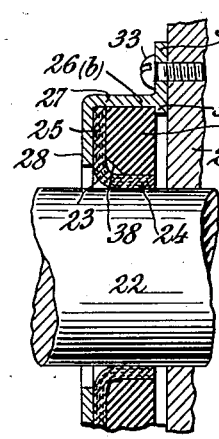
Figs. 5, 6 and 7 illustrate in cross-section modified forms of machine elements, the joints between which may be sealed by means of packing like that illustrated in Fig. 3.

In the modified form of the invention illustrated in Fig. 5 the packing element 23 and resilient ring 29, like those illustrated in Figs. 2 and 3, are used in association with an abutment ring 26(b) having a radially-disposed flange 32 adapted to be secured in oil-tight contact against a surface of the machine element 21(b) by screws or other suitable attaching elements 33. Other parts of the abutment ring are substantially identical with corresponding parts of the ring illustrated in Fig. 1 and are correspondingly numbered.

Figure 6:
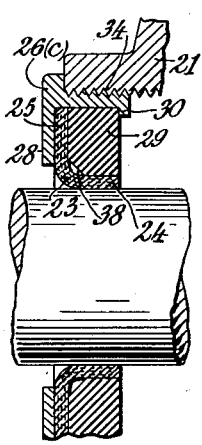

In Fig. 6 is disclosed a modification of the invention comprising a packing ring 23 and resilient ring 29, like those illustrated in Fig. 2, associated with an abutment ring 26(c) secured in oil-tight contact with the machine element 21(c) by means of a threaded engagement as at 34.

Figure 7:
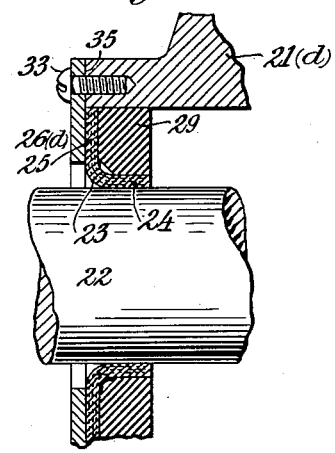

In Fig. 7 is disclosed a modified form of the invention comprising a packing ring 23 and resilient ring 29, like those illustrated in Figs. 2 and 3, associated with an abutment ring in the form of an annular disk 26(d) which may be secured in oil-tight contact with a surface 35 at the end of the machine element 21(d) by screws or other appropriate fastening elements 33.

Figure 8:
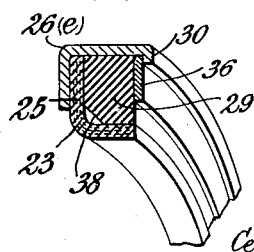
Fig. 8 is a view, partly in cross-section and partly in perspective, of a modified form of the packing illustrated in Fig. 2.

In Fig. 8 is illustrated a modified form of oil seal comprising a packing ring 23 and resilient ring 29, like those illustrated in Fig. 2, associated with an abutment ring 26(e) of slightly greater axial depth than the combined thickness of the resilient ring and radial flange 25 of the packing ring, and having an auxiliary metal retaining or confining ring 36 inserted between the flange 30 and the resilient ring 29.

Figure 9:
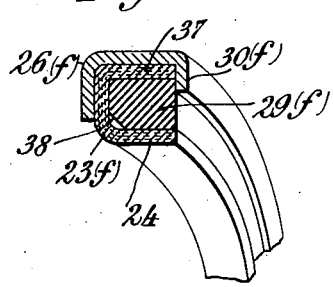
Fig. 9 is a view, partly in cross-section and partly in perspective, of another form of oil-sealing device embodying the invention.

The modified form of sealing device illustrated in Fig. 9 differs from those previously disclosed in that the packing ring 23(f) is of channel form in cross-section, having an outer cylindrical element 37 concentric with and spaced from the sealing lip 24, and the abutment ring 26(f) has a retaining flange 30(f) of a somewhat greater depth than the flange of the sealing device illustrated in Figs. 1 to 3, inclusive, in order that it may extend beyond the edge of the element 37 of the packing ring and have contact with a portion of the adjacent surface of the resilient ring 29(f).

In all forms of the invention the effectiveness of the seal may be enhanced by chamfering the corner 38 of the resilient ring 29, 29(a), 29(f), along the edge adjacent the meeting zone of the sealing lip 24, 24(a), and the radial element 25, thereby localizing the zone of pressure between the resilient ring and the sealing lip at a slight distance from the angle between the sealing lip and the radial flange of the packing ring, whereby the resilient ring may more effectively follow up slight movements of the sealing lip and keep it in close contact with the opposed surface to be sealed.

As distinguished from forms of oil-sealing devices having an openwork metal spring element to maintain the sealing lip in contact with the surface of a machine element at the joint to be sealed, the resilient ring of rubber composition or analogous material is of advantage in that it has surfaces adapted to lie in snug contact with adjacent surfaces of the packing element and abutment ring, thereby tending to maintain all parts of the device in their proper relative positions and otherwise cooperating with them in effecting the seal. The frictional contact between the resilient ring, the packing ring and the abutment ring also tends to prevent rotational movement of the packing ring with respect to the abutment ring, whereby the wear due to friction will be confined to the surface of the packing element which is held in contact with the relatively movable machine element.

The invention is not intended to be limited to the specific forms in which the device has been illustrated and described, but should be regarded as including modifications and variations thereof within the scope of the appended claims.

What is claimed is:—

1. An oil-retaining device to seal a space between a pair of relatively movable machine elements, said device comprising a packing ring having a substantially radial annular portion and a substantially cylindrical annular lip portion to be held compressed against a surface of one of said machine elements with its free edge facing the direction from which the flow of oil is to be intercepted, an abutment ring having a portion fixedly held in oil-tight contact with the other of said machine elements and an annular portion against which the radial portion of the packing ring may be held, a ring of resilient material of the physical properties of soft vulcanized rubber composition within the annular space along the re-entrant angle formed by the radial portion and cylindrical lip portion of the packing ring, and means to prevent the movement of the resilient ring as a whole away from the adjacent surface of the radial portion of the packing ring, the said resilient ring being of a size and radial depth such as to substantially fill and be held under compression within the annular space in which it is seated and thereby hold the lip in sealing contact with the surface of the machine element against which it is pressed, the resilient ring having a chamfered portion along the zone of the packing ring where its cylindrical annular lip portion meets its radial annular portion so as to space the resilient ring from the packing ring along the angle, and the opposed surface portions of the resilient ring and packing ring being disposed in mutual contact except along the chamfered portion of the former.

2. An oil-retaining device, as defined by claim 1, of which the packing ring is channel-shaped in cross section, having two cylindrical lip portions to lie along the inner and outer surfaces of the resilient ring.

CECIL R. HUBBARD.
ROBERT M. WAPLES.